June 11, 1940.                L. W. NASH                2,203,738
         MEANS FOR SEVERING MARGINAL TRIMMINGS AS
            THEY ARE CUT FROM SHEET-METAL STRIP
                 Filed Oct. 14, 1939         2 Sheets-Sheet 1

INVENTOR
Leonard W. Nash,
BY
Fraser, Myers & Manley,
ATTORNEYS.

June 11, 1940.     L. W. NASH     2,203,738
MEANS FOR SEVERING MARGINAL TRIMMINGS AS
THEY ARE CUT FROM SHEET-METAL STRIP
Filed Oct. 14, 1939     2 Sheets-Sheet 2
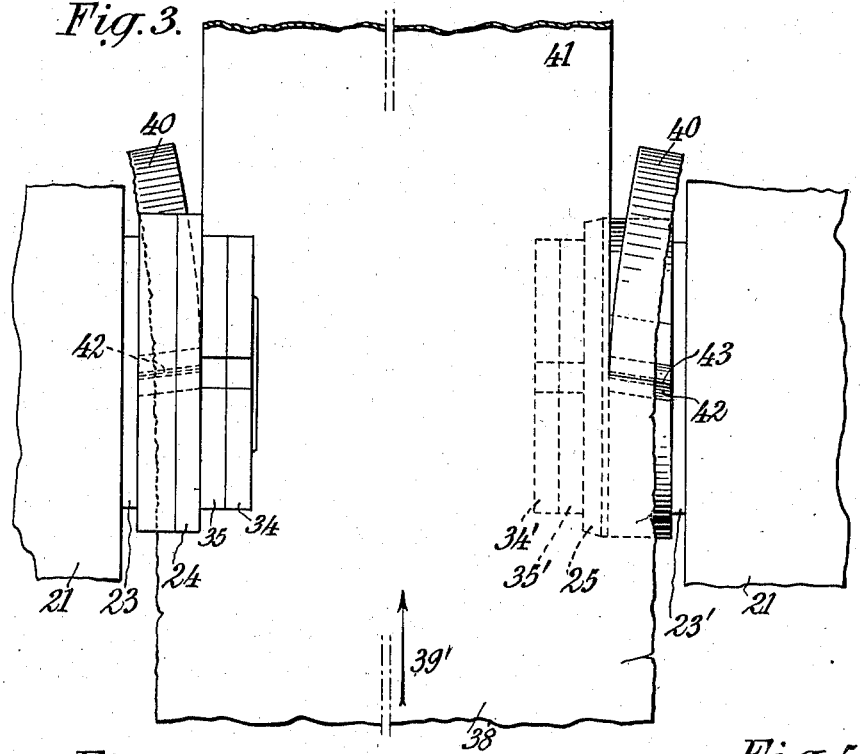
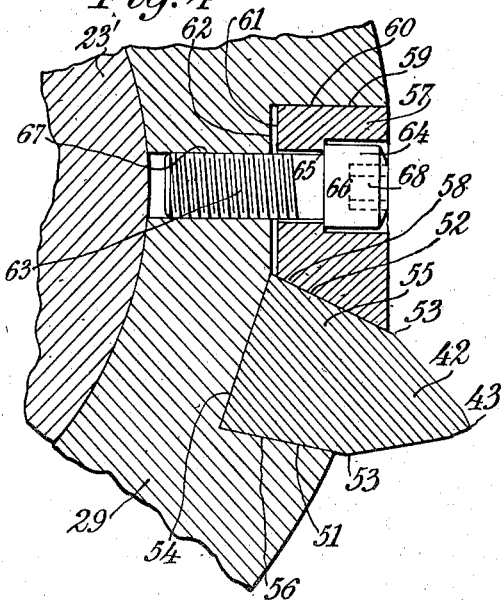
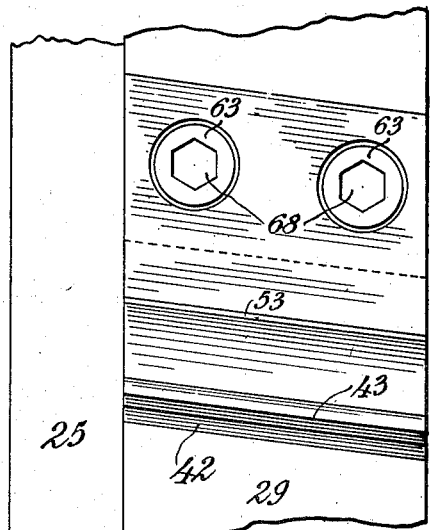
INVENTOR
Leonard W. Nash,
BY
Fraser, Myers & Manley,
ATTORNEYS.

Patented June 11, 1940

2,203,738

UNITED STATES PATENT OFFICE 2,203,738

MEANS FOR SEVERING MARGINAL TRIMMINGS AS THEY ARE CUT FROM SHEET-METAL STRIP

Leonard W. Nash, Damascus, Ohio, assignor to E. W. Bliss Company, Brooklyn, N. Y., a corporation of Delaware Application October 14, 1939, Serial No. 299,425

3 Claims. (Cl. 164—10.6)

This invention relates to improved means for severing material trimmed from the margin of what is known in the art as metal strip.

During the rolling of steel, alloys of steel, and other metals, into thin strip, the edges of the strip usually become serrated or irregular to an extent dependent upon the properties of the particular metal or alloy being rolled.

Due to strains to which the metal is subjected during the rolling process, the marginal irregularities may develop into cracks or splits extending for material distances into the body portion of the strip, thus resulting in an increased amount of scrap which must be trimmed off and wasted.

In order to avoid undue loss of metal as an incident to the production of strip, it is the practice to trim away the marginal portions, as the material is being rolled, by feeding them between a pair of rotary shearing cutters. These marginal trimmings must be disposed of in some appropriate manner as they are produced, in order to avoid interference with the coiling of the trimmed body portion of the strip in readiness for further treatment or for storage and shipment. This has been done in the past either by feeding the narrow marginal strips of scrap to separate coilers or by cutting them into short lengths and removing them from the machine. Such cutting, when it has been resorted to, has usually been effected by severing means located at a material distance from the shearing cutters.

It is an object of the present invention to sever the marginal scrap, as it is trimmed from the body portion of the strip, by means very closely associated with the shearing cutters of the trimming mechanism so that each piece of scrap will be severed almost immediately after it has been sheared, and to do this by means which will tend to deflect the short piece of scrap being severed away from the body portion of the strip from which it has been trimmed, so that it may be readily removed from the machine without interfering with the coiling of the trimmed material.

It is a further object of the invention to make use of the arbors, on which the rotary trimming cutters are mounted, as a mounting means for the parts of the mechanism provided for intermittently severing the trimmed marginal scrap. This has been effected by mounting one or more cutters on the arbor which carries one of the rotary shearing cutters, and by using the periphery of the other of the marginal shearing cutters as at least part of an anvil to be used in cooperation with the scrap-severing cutter.

An important feature of the invention is to mount a disk in close association with the rotary shearing cutter which serves as a part of the anvil for the scrap-severing cutter in such manner that its periphery may be effective as an extension of the peripheral surface of the shearing cutter, so that the shearing cutter and the auxiliary disk will provide an anvil of axial dimensions equal to the axial dimensions of a scrap-severing cutter sufficient to sever a desired width of trimmed scrap.

In the accompanying drawings illustrating the preferred form of the invention, and in which like reference characters are used to represent the same parts throughout—

Fig. 3 is a plan view of the parts of the machine illustrated by Fig. 1, the upper shearing cutter and associated parts at the right side of the figure having been omitted in order to disclose underlying structure.

Fig. 4 is a view in cross section through one of the scrap-severing cutters and means by which it is mounted on the rotary support for one of the shearing cutters.

Fig. 5 is a plan view of the parts illustrated by Fig. 4.

Figure 1:
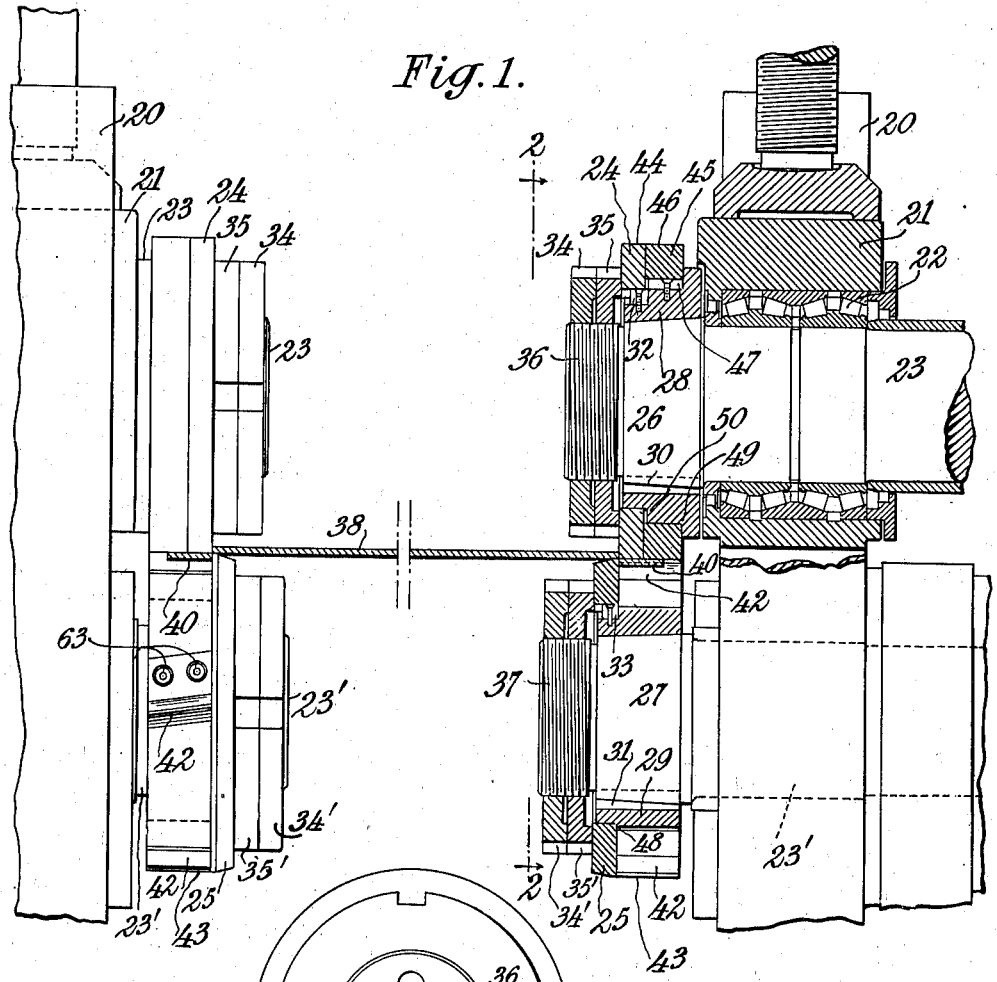
Figure 1 is a vertical view, partly in cross section and partly in elevation, illustrating portions of a strip trimmer provided with means embodying the above-described invention for severing marginal scrap.
Figure 2:
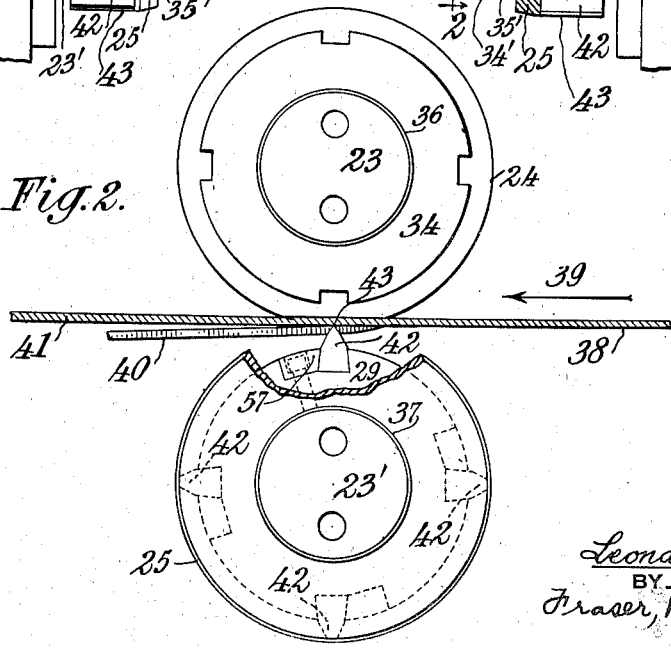
Fig. 2 is an elevational view of the parts of the machine to the right of the plane represented by the line 2—2, Fig. 1, as viewed in the direction indicated by the arrows, parts being broken away to illustrate underlying structure.

Referring first to Figs. 1, 2 and 3, the parts 20, 20 are end portions of the frames of a pair of metal-strip-trimming machines in which are supported mounting elements 21, 21 for antifriction roller bearings 22, adapted to support journals of arbors 23, 23' provided as means for rotating pairs of metal-strip-trimming cutters 24, 25.

The opposite ends of the frames 20 and bearings for the opposite ends of the arbors 23, 23' may conform with similar parts of machines of the prior art, and are not shown.

The shearing cutters 24, 25 may be secured to conical portions 26, 27 of their arbors 23, 23', through the intermediary of hubs 28, 29, rotation of which with respect to the arbors may be prevented in any appropriate manner as by keys 30, 31, and relative rotation between the cutters and the hubs may be prevented in any appropriate manner as by keys 32, 33.

Endwise separation of the cutters 24, 25 from the hubs 28, 29 may be prevented by suitable fastening means such as lock-nuts 34, 34', 35, 35', having threaded connections 36, 37 with the ends of the arbors 23, 23'. In Fig. 2 of the drawings the lock-nuts 34', 35' on the end of the arbor 23' have been omitted in order to avoid confusion with the disclosure of underlying structure.

The above-described shearing cutters 24, 25 and their mounting means conform in general with similar parts of trimming machines of the prior art which may be used to shear irregular marginal portions from sheet-metal strip as it is rolled. Such mechanism alone constitutes no part of the invention herein disclosed and claimed.

In Figs. 1, 2 and 3 a strip of sheet-metal 38 is represented as being fed in a direction indicated by arrows 39, 39', so that its opposite marginal portions 40 will be sheared from the remaining body portion 41. In order that the trimming machine may be adapted to trim strip metal of varying widths, means (not shown) may be provided whereby the portions which trim the opposite margins of the strip represented at the right and left hand sides of Figs. 1 and 3 may be adjusted by moving them towards or from each other.

A preferred form of the novel marginal scrap-severing means embodying the invention herein to be claimed will now be specifically described.

The scrap-severing means may comprise one or more—four being herein disclosed—stocky, wedge-shaped cutting tools 42, which may be mounted upon the hub 29 of each of the lower arbors 23' which carry the shearing cutters 25. These knives or cutting tools 42 should have cutting edges 43 extending laterally with respect to the plane of the shearing edge of the said cutter 25 and so disposed with respect to said edge as to lie within the surface defined by an imaginary cylinder of the diameter of the cutting edge of said shearing cutter.

The length or axial dimension of each of the cutting tools 42 should be slightly in excess of the maximum width of marginal scrap to be severed from strip as it is being trimmed.

In the form of the invention herein disclosed the peripheral surface 44 of the shearing cutter 24 of each trimming mechanism serves as an anvil for at least part of each of the scrap-severing cutting tools 42.

An important feature of the invention now to be described makes it unnecessary to use a shearing cutter 24, which is constructed of relatively expensive material, of an axial dimension or thickness equal to the axial dimensions of the cutting tools 42. To this end a disk 45, having a peripheral surface 46 of a diameter equal to the diameter of the cutter 24, may be mounted on the hub 28 in face-to-face contact with said cutter 24 so that the peripheral surfaces 44 and 46 of the said disk and cutter may jointly serve as an anvil, which, by suitably dimensioning the thickness of the disk 45, may equal the axial dimensions of each of the cutting tools 42. Relative rotary movement of the disk 45 with respect to the hub 28 may be prevented by any appropriate means, such, for example, as a key 47.

The cutter 25 may be fixedly held between a shoulder 48 on the hub 29 and the lock-nut 35', and the cutter 24 and disk 45 may be fixedly held between shoulders 49 and 50 on the hub 28 and the lock-nut 35.

As best illustrated by Figs. 4 and 5, each of the wedge-shaped cutting tools 42 has its inclined surfaces so flared at 51, 52, as to gradually increase its thickness from an intermediate zone 53, 53 to its base 54.

The cutting tool 42 may be nested in one end of a slot 55 in the peripheral surface of the hub 29, having one end wall 56 so inclined as to be complemental to the surface 51 of the cutting tool.

As a means whereby the cutting tool 42 may be firmly held in the slot 55 of the hub 29, there is provided, as a feature of the invention to be claimed a wedge-shaped clamping element 57 having one end wall 58 so inclined as to be complemental to the inclined surface 52 of the cutting tool 42 and an end wall 59 so disposed as to be complemental to the end wall 60 of the slot 55.

As indicated in Fig. 4, the parts of the cutting tool 42 and clamping element 57 should be so dimensioned that the clamping element may be held wedged in the space between the tool 42 and the end 60 of the groove with its under surface 61 free from contact with the bottom 62 of the groove. The clamping element may be forced into its firm holding relation with respect to the tool 42 and caused to maintain the parts of the device in their assembled relation by means of one or more—two being shown—screws 63 having heads 64 to engage shoulders 65 at the bases of recesses 66 in the clamping element, and ends 67 in threaded engagement with the hub 29.

Hexagonal recesses 68 in the heads of the screws 63 afford means whereby they may be engaged with a suitable implement and rotated.

Preferably the axes of the screws 63 will be radially disposed with respect to the axis of rotation of the hub 29, and the contact plane of the complemental surfaces 59, 60 of the clamping element and groove in the hub will be parallel with the plane defined by the axes of the screws.

It will be apparent that the cutting tool 42 may be readily detached from the hub 29, for purposes of sharpening or renewal, by the removal of the screws 63 and the clamping element 57, but when nested in one end of the groove as indicated in Fig. 4, it may be firmly held in its fixed relation with respect to the hub 29 by the clamping element 57, one end 59 of which may be caused by rotation of the screw to slide along the surface 60 of the groove as the other end surface 58 is forced into its wedging engagement with the flared surface 52 of the tool.

As best illustrated by Figs. 3 and 5, the cutting edge of each of the scrap-severing tools 42 is slightly inclined with respect to a perpendicular to the plane of the edge of the shearing cutter with which it is associated, and the inclination is such that the leading end of the cutting tool as determined by the direction of rotation of the shearing cutter will be that end which is adjacent said cutter. This inclination of the edges of the scrap-severing cutters is an important feature of the invention in that it causes the leading end of the scrap-severing cutter to force its way into the scrap at the point at which it is being severed from the body portion of the strip which is being trimmed in a wedge-like manner so as to deflect the short lengths of scrap 40 away from the body portion, as best illustrated by Fig. 3, thereby facilitating its ready removal from the machine and preventing the pieces of crap being trimmed from in any manner interfering with the coiling of the trimmed body portion of the strip. The short lengths of scrap 40 as they are severed by the tools 42 may be caused to drop into containers (not shown) properly placed for such purpose and which may be removed from time to time, or they may be caused to fall onto mechanical conveyors (not shown) by which they may be carried away from the machine as they are cut.

It is believed that the operation of the machine embodying the invention herein disclosed and claimed will be apparent from the foregoing description of the apparatus.

The invention is not intended to be limited to the specific features which have been selected for purposes of illustration, but should be regarded as including modifications and variations thereof within the scope of the appended claims.

What is claimed is:

1. The combination, with a pair of rotary shearing cutters, adapted to continuously trim the margin of sheet-metal strip as it is fed between them, and a pair of arbors to serve as their mounting means, of means for intermittently severing the resulting marginal scrap, as it is sheared from the body portion of the strip, into a succession of separated pieces of predetermined length, said severing means comprising a knife mounted on the arbor of that one of the two shearing cutters which is designed to be farthest from the margin of the strip to be trimmed and so positioned with respect thereto that its edge may be forced into and caused to sever the scrap as it is sheared by pressing it against the periphery of the other shearing cutter which thus serves as an anvil, the edge of the knife being so disposed as to extend laterally with respect to the plane of the shearing edges of the trimming cutters and inclined at a slight angle with respect to a perpendicular to said plane, the inclination being such that the leading end of the knife, as determined by the direction of rotation of the arbor on which it is mounted, will be the end nearest the shearing cutter which is mounted on the same arbor, so that as it enters the piece of trimmed material to be severed it will tend to deflect it away from the adjacent trimmed edge of the body portion.

2. The combination, defined by claim 1, of which the scrap-severing means comprises a plurality of knives mounted in a circumferentially spaced relation about the knife-mounting arbor, whereby a plurality of pieces of the scrap being sheared from the margin of the metal strip will be severed at each revolution of the said arbor.

3. The combination, defined by claim 1, of which the axial dimension or thickness of the shearing cutter which serves as an anvil is of smaller magnitude than the axial dimension or length of the scrap-severing knife, and of which the scrap-severing means includes a disk mounted on the arbor which carries the said cutter, in a coaxial relation, with one of its lateral surfaces in contact with the non-shearing surface of the said cutter, the peripheral surface of the disk being of a form and dimensions such as to constitute an axial extension of the peripheral surface of the cutter to a degree such as to provide an effective anvil of dimensions commensurate with the effective length of the scrap-severing knife and the desired width of marginal scrap to be severed.

LEONARD W. NASH.